US008923893B2

(12) United States Patent
Austin et al.

(10) Patent No.: US 8,923,893 B2
(45) Date of Patent: Dec. 30, 2014

(54) REAL-TIME PLANOGRAM GENERATION AND MAINTENANCE

(75) Inventors: Timothy Austin, Stony Brook, NY (US); Russell Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 127 days.

(21) Appl. No.: 13/568,175

(22) Filed: Aug. 7, 2012

(65) Prior Publication Data

US 2014/0045515 A1  Feb. 13, 2014

(51) Int. Cl.
*H04W 24/00* (2009.01)
*H04W 4/02* (2009.01)

(52) U.S. Cl.
USPC ............ 455/457; 455/456.1; 455/456.2; 455/456.3; 455/456.5; 455/456.6; 702/150; 702/152; 702/153; 367/8; 367/119; 367/120; 705/26.9

(58) Field of Classification Search
CPC . G06Q 30/02; G06Q 10/087; G06Q 30/0201; G06Q 30/0633; G06Q 10/04; G06Q 30/0643; G06Q 20/203; G06Q 20/3224; B62B 3/1424; B62B 5/0096; G06K 2017/0045; H04W 4/02; H04W 4/025; H04W 4/04; H04W 4/043; H04W 84/12; H04W 64/00; H04M 3/42348
USPC ............ 455/456.1–457; 705/26.9; 367/8–10, 367/119–130; 702/150, 152, 153
See application file for complete search history.

(56) References Cited

U.S. PATENT DOCUMENTS

| | | | |
|---|---|---|---|
| 5,214,615 A * | 5/1993 | Bauer | 367/128 |
| 6,141,293 A * | 10/2000 | Amorai-Moriya et al. | 367/127 |
| 6,304,855 B1 * | 10/2001 | Burke | 705/26.9 |
| 6,442,507 B1 | 8/2002 | Skidmore et al. | |
| 6,721,769 B1 | 4/2004 | Rappaport et al. | |
| 7,493,336 B2 | 2/2009 | Noonan | |
| 7,885,865 B2 | 2/2011 | Benson et al. | |
| 8,049,621 B1 | 11/2011 | Egan | |
| 8,207,964 B1 | 6/2012 | Meadow et al. | |
| 2008/0294487 A1 | 11/2008 | Nasser | |
| 2009/0125350 A1 | 5/2009 | Lessing et al. | |
| 2009/0125535 A1 | 5/2009 | Basso et al. | |
| 2009/0192921 A1 | 7/2009 | Hicks | |
| 2010/0070365 A1 * | 3/2010 | Siotia et al. | 705/14.49 |
| 2011/0254840 A1 * | 10/2011 | Halstead | 345/421 |

(Continued)

FOREIGN PATENT DOCUMENTS

| | | |
|---|---|---|
| EP | 1311993 | 5/2007 |
| WO | 03025805 | 3/2003 |

OTHER PUBLICATIONS

U.S. Appl. No. 13/329,383, filed Dec. 19, 2011.

*Primary Examiner* — Allahyar Kasraian (57) ABSTRACT

Generating a planogram of a facility in real-time, includes positioning a wireless mobile device at a plurality of geometric positions within the facility. A location of the mobile device at each position is then established using a location mechanism. Each geometric position is then associated with that location of the mobile device. The planogram is then updated with information about the geometric position. The geometric positions are associated with physical objects modeled in the planogram. Non-geometric information can also be obtained at the location of the mobile device, and this non-geometric information can be overlaid onto the planogram.

17 Claims, 10 Drawing Sheets

(56) References Cited

U.S. PATENT DOCUMENTS

| | | | |
|---|---|---|---|
| 2011/0288816 A1* | 11/2011 | Thierman | 702/151 |
| 2012/0019393 A1 | 1/2012 | Wolinsky et al. | |
| 2012/0022913 A1 | 1/2012 | Volkmann et al. | |
| 2013/0119138 A1* | 5/2013 | Winkel | 235/462.1 |
| 2013/0178227 A1* | 7/2013 | Vartanian et al. | 455/456.1 |
| 2013/0300729 A1* | 11/2013 | Grimaud | 345/419 |
| 2013/0303193 A1* | 11/2013 | Dharwada et al. | 455/456.3 |

\* cited by examiner

| | RECTANGULAR SHELVING |
| --- | --- |
| | DISPLAY COUNTER |
| ○ | CIRCULAR RACK |
| ⊔ | POINT OF SALE |
| ⋈ | DOOR |
| o | PRICE CHECKER |
| × | POWER OUTLET |

REAL-TIME PLANOGRAM GENERATION AND MAINTENANCE

FIELD OF THE DISCLOSURE

The present disclosure relates generally to ultrasonic devices and more particularly to real-time planogram generation and maintenance using ultrasonic devices.

BACKGROUND

Many enterprises are arranged according to a central plan that provides a layout of fixtures and goods offered by the enterprise within a defined facility. One type of central plan is a planogram that is a diagram of fixtures, fittings and products that illustrates how and where retail products should be displayed. An essential part of creating a planogram is collecting information about the geometry of the underlying retail space (floor levels, walls, doors, obstructions, etc.) and location and size of fixtures (shelves, racks, display cases, etc.) and fittings (power outlets, communication devices, points-of-sale, etc.).

In addition, this geometric information can change as the retail space, fixtures and fittings change, necessitating updating of the planogram over time. Accurate display and analysis of location based information is hindered if there is a lack of accurate planogram geometry either because it was not initially generated or it has not been maintained, e.g. when a store is reconfigured.

Accordingly, there is a need for generating and maintaining a planogram in real-time.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for generating and maintaining a planogram in real-time, in accordance with some embodiments of the present invention. In particular, the present invention utilizes a locationing system that can provide accurate locationing of a wireless mobile device, and associating the location of the device to a physical, geometric object that can be configured and mapped on the planogram in real-time. This present invention can capture accurate three-dimensional datums (i.e. reference locations in three-dimensional space) that define the geometry of fixtures and fittings recorded by the same hand held mobile device using the locationing system.

In addition, the present invention can simultaneously provide non-geometric information from the mobile device at different locations, where the non-geometric information can be overlaid on top of the geometric planogram information. Examples include: SKU (stock keeping units) locations, wireless local area network signal strength, mobile device signal strength, and (ultrasonic) locationing system parameters.

Radio frequency (RF) locationing systems are well known. However, their accuracy is insufficient for the embodiments of the present invention. In contrast, ultrasonic waves (i.e., sound waves) are much slower (approximately one million times slower) than radio frequency (RF) waves. Therefore, more accurate locations can be determined, e.g., to within a square inch of resolution, which is preferable. However, other techniques and measurements could be used to locate the mobile devices. In alternative embodiments, the location of the mobile device could be determined using radio frequency energy (e.g., using Wi-Fi™ or Zigbee) or optical signals.

Ultrasonic location techniques measure the different amounts of time it takes from the moment a sound wave is transmitted from an ultrasonic emitter of a mobile device to the moment the sound wave is received at each of an array of multiple microphones at an ultrasonic receiver and, thereby allowing the calculation of the distance and angle to the emitter. As a result, the location of the mobile device can be located in three-dimensional space within a facility.

The mobile device to be locationed and incorporating the emitter can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, radio frequency identification reader, barcode scanners, and the like, all referred to herein as a mobile device. Each mobile device comprises a processor that can be further coupled to the ultrasonic emitter, a keypad, a speaker, a microphone, a display, signal processors, and other features, as are known in the art and therefore not shown.

Various other entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Figure 1:
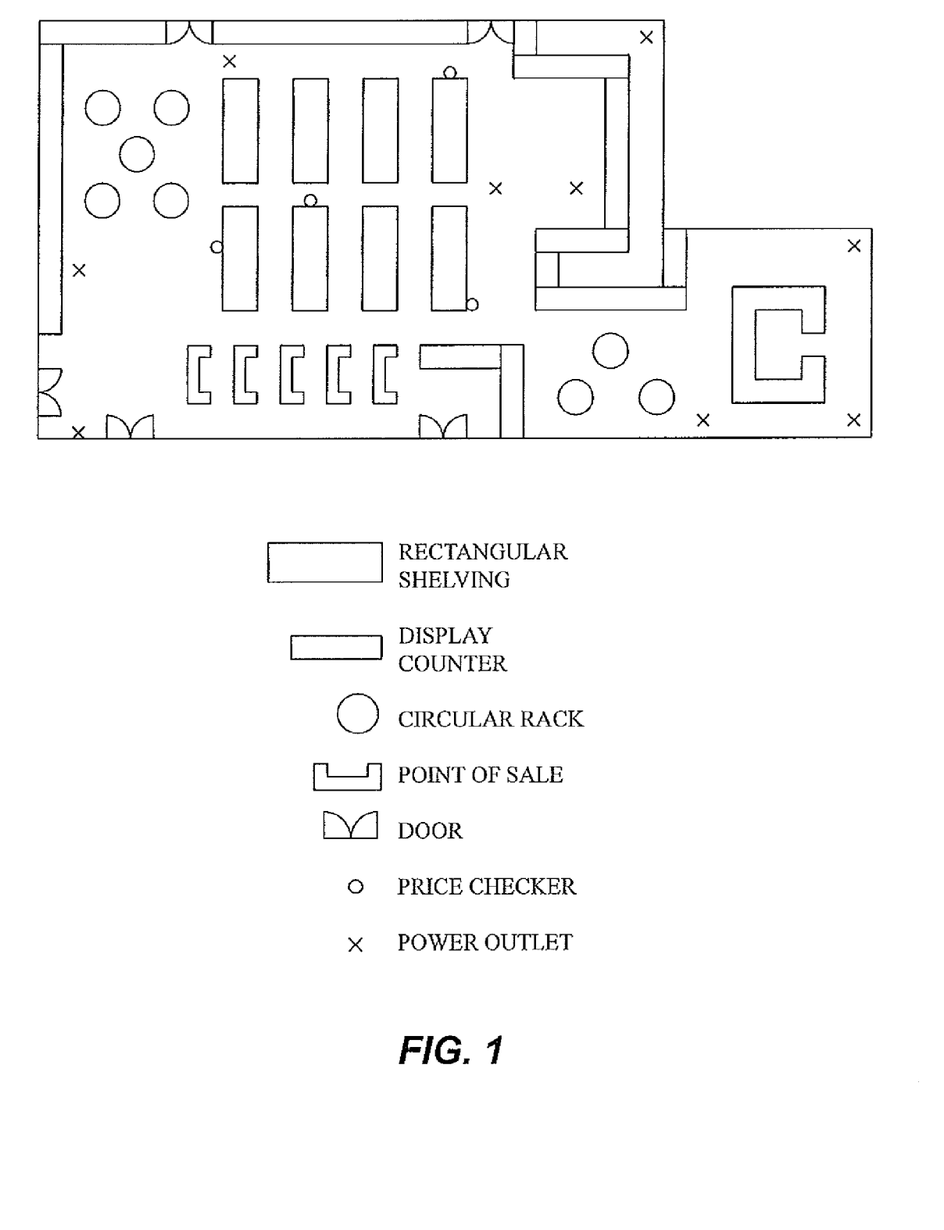
FIG. 1 is a planogram of an example floor plan of a facility.

Referring now to FIG. 1, a block diagram shows an illustrative floor plan layout planogram, which is generated, updated, and maintained in accordance with embodiments of the present invention. If the facility has multiple floors or rooms, a different planogram can be provided for each. The planogram includes generalized models of physical objects, such as rectangular shelving display counters, circular racks, point of sale object (e.g. checkout counter or kiosk), price checkers, and building fixtures such as doors, windows, power outlets, walls, etc. The physical objects can be modeled in a database and these models can include generalized physical attributes of the objects, which may or may not include specific dimensions. For example, a circular rack is modeled as a right cylinder having a height and diameter. The exact height and diameter of the circular rack may be open variables in the model that can be specified by measurements of the rack taken at the same time when the location of the mobile device is determined, in accordance with the present invention. Similarly, rectangular shelving can be modeled as a right rectangular box with height, width, and depth dimensions. The objects shown are merely examples, and many other objects including irregularly shaped objects can be modeled in the database.

Figure 2:
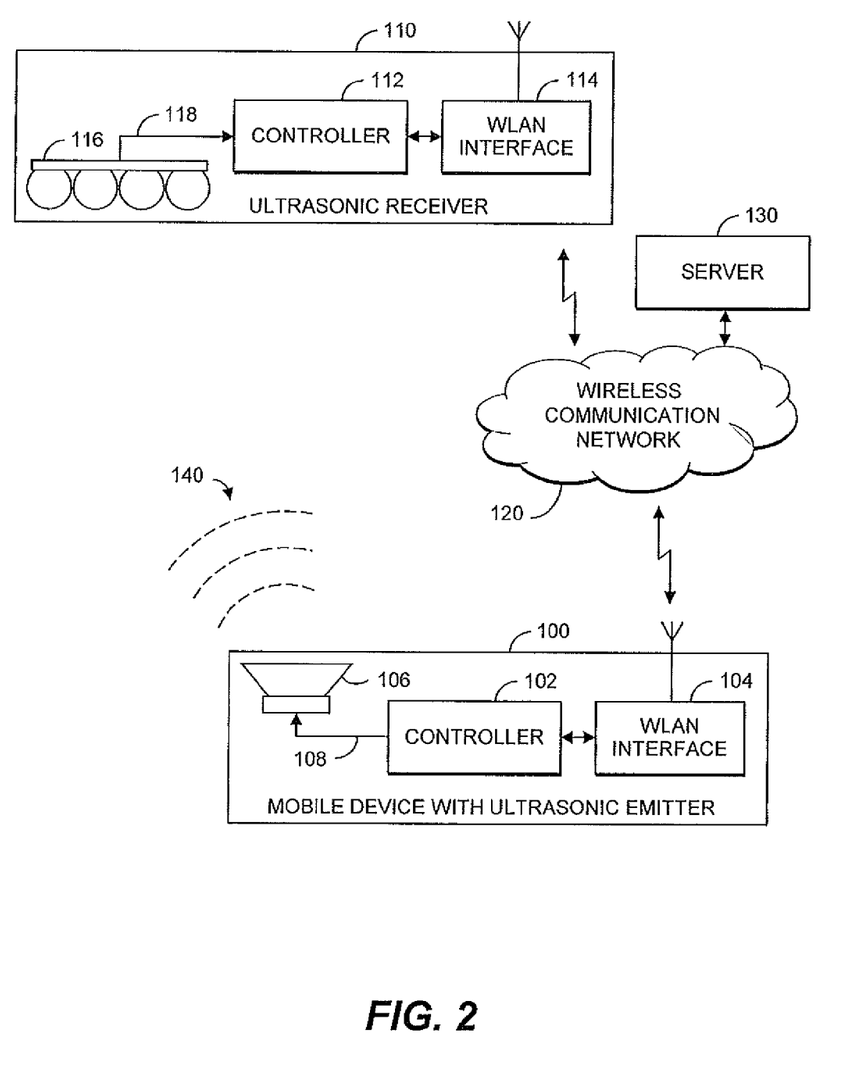
FIG. 2 is a block diagram of a system for generating and maintaining a planogram in real-time, in accordance with some embodiments of the present invention.

FIG. 2 is a block diagram of an ultrasonic locationing system, in accordance with the present invention. One or more ultrasonic transponders such as a piezoelectric speaker or emitter 106 can be implemented within the mobile device 100. The mobile device 100 can trigger the emitter to send a short burst of ultrasonic sound (e.g. 140) within the facility. The controller 102 can also be coupled to a wireless local area network interface 104 for wireless communication with other devices, such as a server 130, in the communication network 120.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.15.4 (Zigbee), 802.16, or 802.20, modified to implement embodiments of the present invention. The protocols and messaging needed to establish such networks can be any suitable proprietary or standard wireless protocol known in the art and will not be presented here for the sake of brevity.

An ultrasonic receiver 110 includes a transducer such as an array of multiple ultrasonic microphones 116 that can respond to the ultrasonic sound pressure wave (e.g. 140) transmitted from the ultrasonic emitter 106 of the mobile device for determining a location of the mobile device within a facility (e.g., within the entire enterprise or a portion of the enterprise such as a single floor of a building). It is envisioned that the ultrasonic receiver 110 is mounted on a ceiling in a centralized location above the floor, such as that of FIG. 1. Each microphone 116 provides electrical signals 118 to a receiver circuitry including signal processors (not shown) and a controller 112. The receiver controller 112 can also be coupled to a wireless local area network interface 114 for wireless communication with other devices, such as server 130, in the communication network 120. Alternatively, the controller 112 could be connected to the communication network 120 through a wired interface connection (not shown), such as an Ethernet interface connection. Other components needed for a commercial embodiment of system are omitted from the drawing for clarity in describing the enclosed embodiments.

In order to provide the ability to accurately locate the mobile device, using a multilateration technique for example, the transducer of the present invention includes a plurality of microphones 116 able to discriminate between different arrival times of the ultrasonic signal 140. In one embodiment, there are four microphones 116 integrated within a single receiver 110 housing. In this embodiment, three of the microphones can be disposed at each apex of a substantially triangular configuration, such as in a substantially flat triangular housing, and are configured in an array having a maximum dimension of not more than twelve inches, and where the fourth microphone is disposed in the middle of the triangular configuration. The fourth microphone could be substantially coplanar with the other microphones for example, or it could be located out of the plane of the other microphones. For unobtrusiveness and clear signaling, the housing can be affixed to a ceiling of the facility, where the position of each microphone is assumed to be known and fixed.

Of course, it should be recognized than many different housing and microphone configurations could be utilized with any number of microphones. However, the embodiment described herein utilizes relatively closely-spaced microphones within a singular housing, where a signal received by these microphones can be used to locate and track the position of an ultrasonic emitter device using trilateration or multilateration of time difference of arrival (TDOA) of acoustic signals (e.g. ultrasonic, infrasonic, etc.) at each microphone, or other suitable locationing technique. In particular, the ultrasonic receiver listens for the ultrasonic burst from the ultrasonic emitter triggered in a mobile device. The locationing system then implements an acoustics-based locationing algorithm to locate the mobile device. The locationing algorithm can be implemented in a controller 112 of the receiver, or preferably the locationing algorithm can be implemented in a server 130, where information about the timing of the received signals can be transmitted by the receiver 110 to the server 130 to implement the locationing algorithm. Where multiple floors/receivers are being utilized, the server can communicates with each ultrasonic receiver to locate mobile devices.

In this illustrative implementation, the server 130 is a computer system residing within an enterprise. The server 130 keeps track of physical objects and fixtures in the facility. The server can also keep track of goods (e.g., merchandise, products, etc.) offered by the enterprise. The layout of objects within the enterprise is recorded on a central plan, such as a planogram, maintained by the server 130. A processor within the server 130 maintains the planogram and may be further programmed to generate and update the planogram in accordance with the present invention. Other examples of or names for a planogram include, but are not limited to, a floor plan, a map, an internal plan of a building, a central plan, etc.

Figure 3:
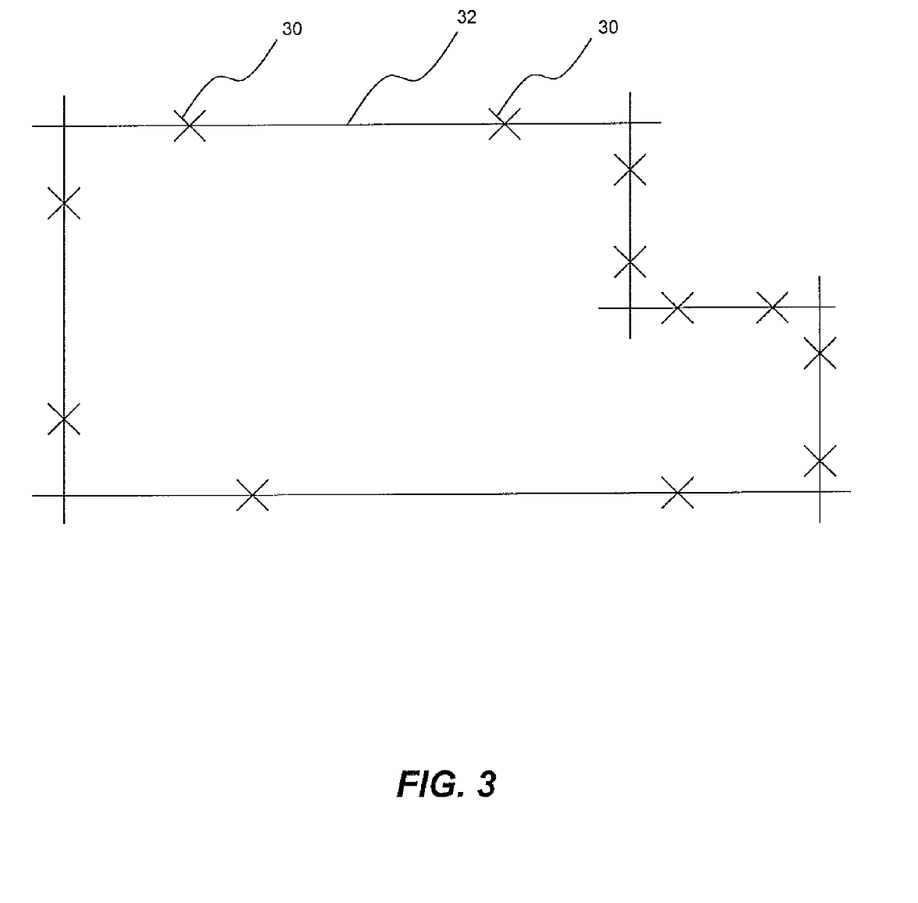
FIG. 3 is a diagram of measuring points to define a floor boundary, in accordance with some embodiments of the present invention.

A first step in generating a new planogram would be to establish the floor boundaries, as shown in FIG. 3, to map out the edges and plane of the floor space. In this example, users of the mobile device can signal to the server that they will be conducting floor boundary measurements, such as by the user selecting a predefined menu item on a display of keyboard of the mobile device. This selection can be transmitted wirelessly to the server, which can return a confirmation signal to the user to proceed with the measurements. The confirmation signal can be of any form recognizable by the user, such as a particular tone, vibration, light, or combinations thereof. The mobile device can then be positioned at two places 30 along each linear floor edge 32 and the user can trigger the recording of the datum at each place 30. In particular, the emitter of the mobile device can be triggered to emit an ultrasonic burst, such as by a user pressing a trigger button, and the locationing system can determine the location of the device, and therefore the floor edge by association, for the server planogram database. At least two points are required for each edge of a floor. It is envisioned that after each measurement the server will return some type of confirmation signal to either move on to the next point (i.e. that it has made a proper location calculation) or re-record the same point over again (i.e. the location calculation failed). As edge data is accumulated, the server can connect each intersecting edge to define the floor boundary. In addition, once at least three non-collinear points are collected at floor level, the plane of that floor can be calculated. Afterwards, the user of the mobile device can then select another menu item on the mobile device indicating that floor edge measurements are complete, which can be confirmed by the server, as before. It should be noted that each time the trigger is activated, the mobile device can send simultaneous non-geometric data (e.g. signal strength) to the server to be mapped onto an overlay of the planogram.

Feedback during the recording process is also important: the user can also get a trigger pull confirmation along with a location calculation confirmation. For example, a trigger would be a beep of one pitch followed by a second beep of the same pitch to indicate a successful location recording or a beep of a lower pitch to indicate an additional trigger pulls are required to successfully record the location.

When the plane of the floor has been established, this becomes the datum plane for future geometric calculations and accurate positioning of objects in three-dimensions on the planogram. The datum plane also provides a technique for compensating for sloping floors or tilt in the locationing system; this process can be repeated over time to re-level the locationing system.

Figure 4:
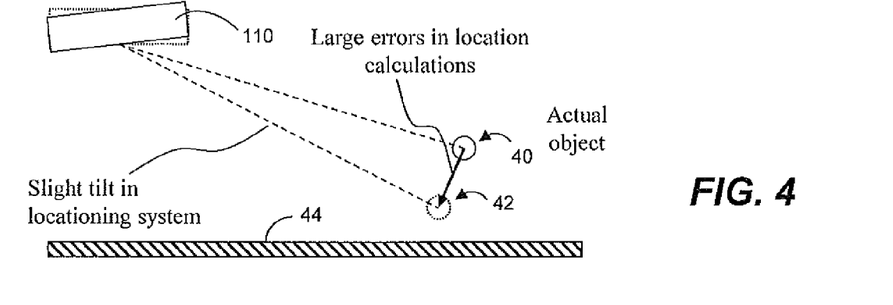
FIGS. 4-6 are diagrams illustrating the compensation of tilt in the mounting of the ultrasonic receiver, in accordance with some embodiments of the present invention.

For example, referring to FIG. 4, an ultrasonic receiver 110 can be mounted on a ceiling of a facility. However, it may be that the receiver is not mounted perfectly level. In this case, when the receiver is used to determine a distance and angle to a position 40, the angle will actually be in error since the locationing system will assume that the receiver was mounted level. In this case the locationing system will establish a false position 42. To compensate for this, the locationing system can be used to establish a datum plane of the floor 44, assuming that the floor is relatively level and flat even if the receiver is not.

Figure 5:
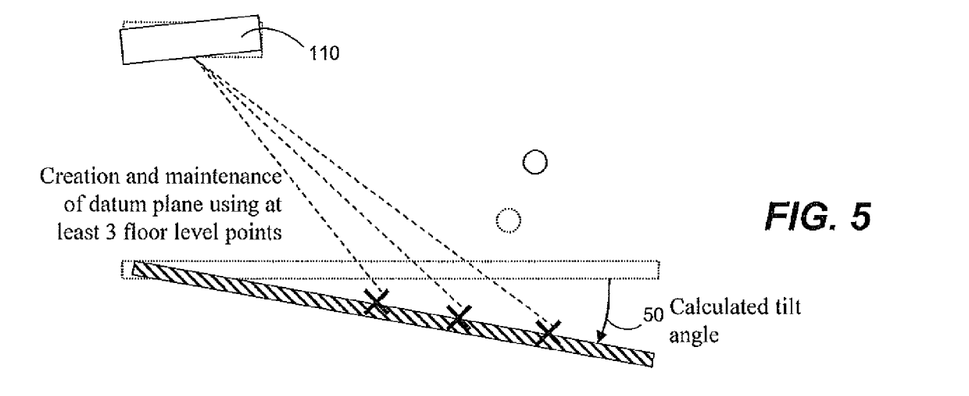

Referring to FIG. 5, the floor can be measured at three non-collinear points to determine a plane of the floor. The locationing system, which incorrectly assumes that the receiver is level, will establish that the floor is tilted by a certain angle 50, when actually it is level and flat. However, this incorrect measurement is actually due to the receiver 110 being tilted at that angle 50.

Figure 6:
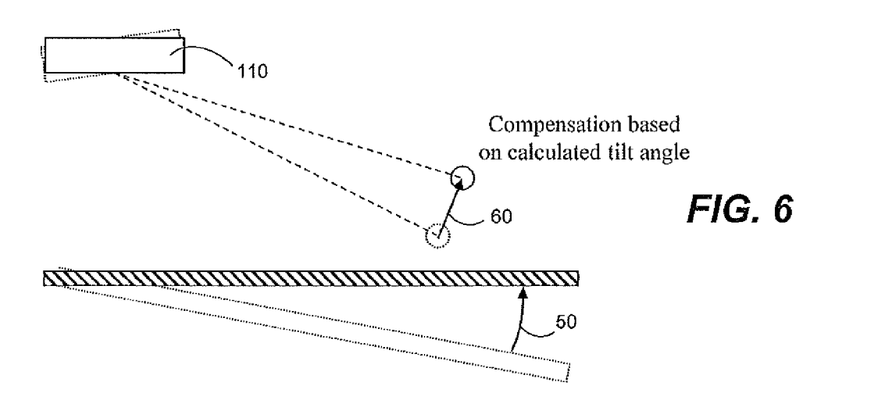

Referring to FIG. 6, the locationing system can be configured to assume that any measured floor tilt is actually erroneous, and that any such measured floor tilt 50 is actually due to an improper installation of the receiver 110. Therefore, to compensate for this, any position calculated by the locationing system can be compensated for by changing its calculated angle 60 by an amount equal to that previously measured for the floor 50. Once the angle compensation measurements are establish, the receiver can repeat this process over time to re-level the locationing system or compensating for sloping floors.

Figure 7:
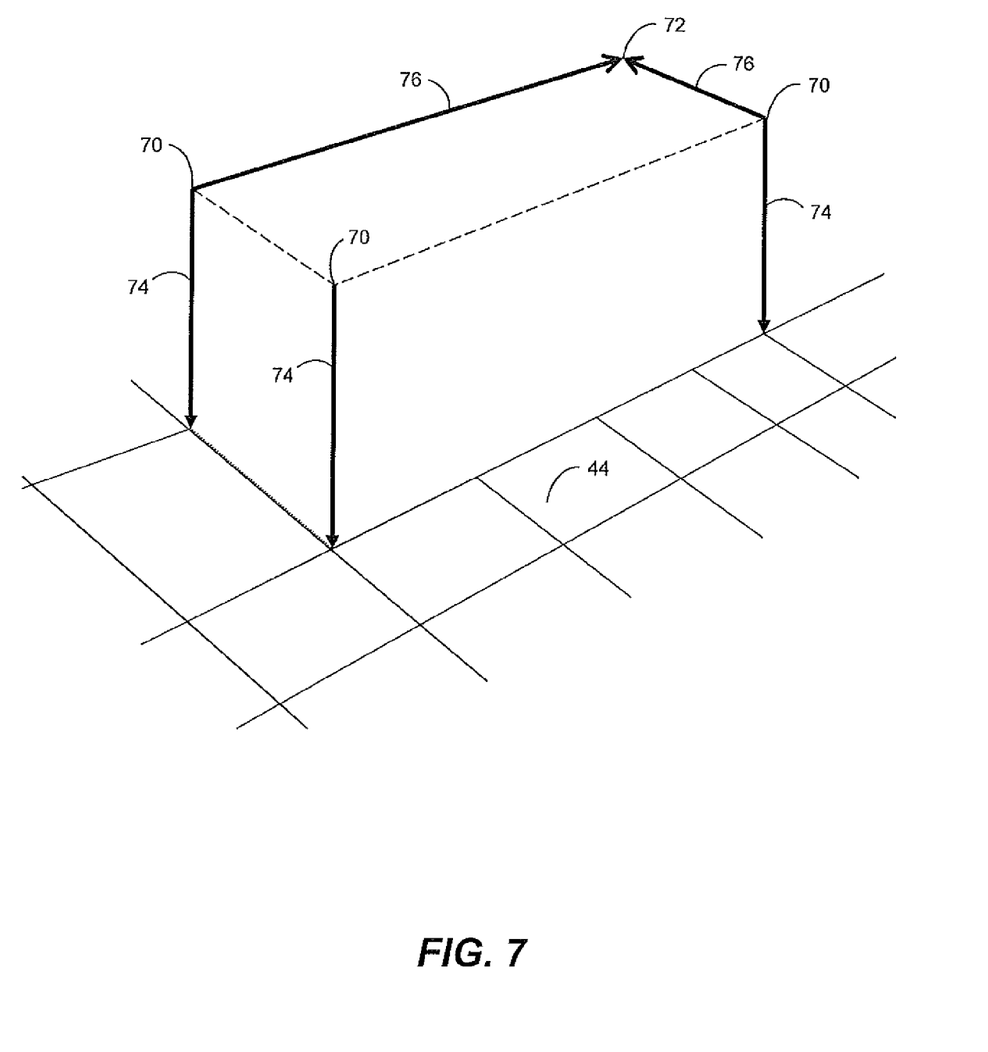
FIG. 7 is a perspective view of the three-dimensional inference of a physical object, in accordance with some embodiments of the present invention.

Once a floor datum plane and it edge boundaries are established, physical objects can then be mapped onto the planogram. Referring to the example of FIG. 7, large fixtures and fittings can easily be added by selecting the proper model from the database of the server on the mobile device, and then holding the mobile device at the top of the fixture or fitting and pulling the trigger to define the shape of the top. The server could use a best fit algorithm to establish the rectangular top given the measured points. For example, a rectangular shelving unit or display case could be defined in three-dimensional space by selecting and recording the four top corners 70, 72, and since the locationing system recognizes that these four corners are at a particular height above the floor it can extrude the sides 74 of the shelving unit down to the floor 44, thereby completely defining the physical object of a rectangular shelving unit. Alternatively, since the object is a regular rectangular box, the server need only input the positions of three top corners 70, inferring the fourth corner 72 to complete the right rectangle, and then extruding this rectangle down 74 to the plane of the floor. Modeled circular racks could be defined in a similar manner by recording the center of the top and a point on the circumference to define a circle to be extruded down to the floor. Other modeled shapes could be similarly constructed. Irregular shapes would require measurements at each corner. Each of these defined or inferred physical objects would then be added to the planogram at the locations measured.

A menu of potential features can be available to the user on the mobile device while recording progresses to speed up the data capture process. These features might include things like: walls, doors, rectangular shelves, circular racks, square racks, access points, power outlets, irregular objects (with non-rectangular or circular shapes), etc. These might be selected from a pull down menu or via a voice command. Commonly, a user might wish to record the location of a specific family of objects. To facilitate this, the last object measured is the default setting for the next object measured. For example, if a user wants to record the location of all the power outlets and price checkers in a room, they can select "power outlet" from the menu and place the mobile device by first power outlet and pull the trigger. Subsequent trigger pulls then record the location of power outlets until the user exits the menu or selects another feature such as "price checkers" at which point subsequent trigger pulls will record the location of price checkers.

Figure 8:
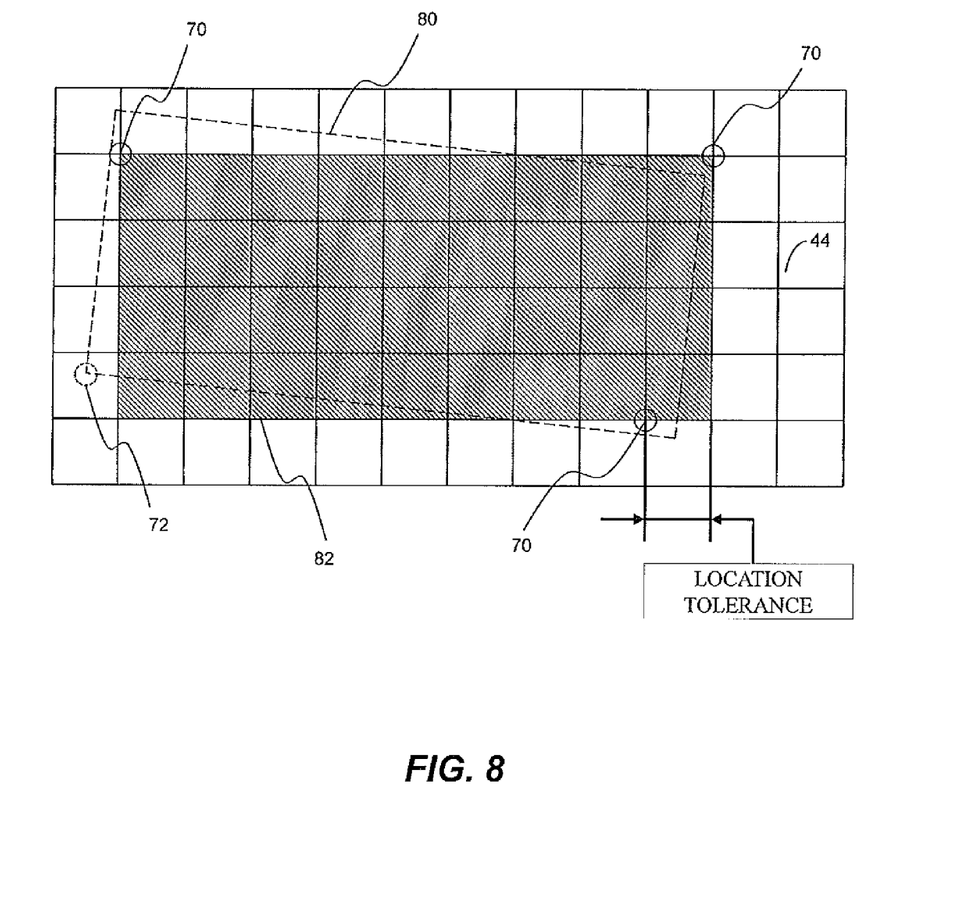
FIG. 8 is a graphical representation of the derivation of a footprint of an object on a floor, in accordance with some embodiments of the present invention.
Figure 9:
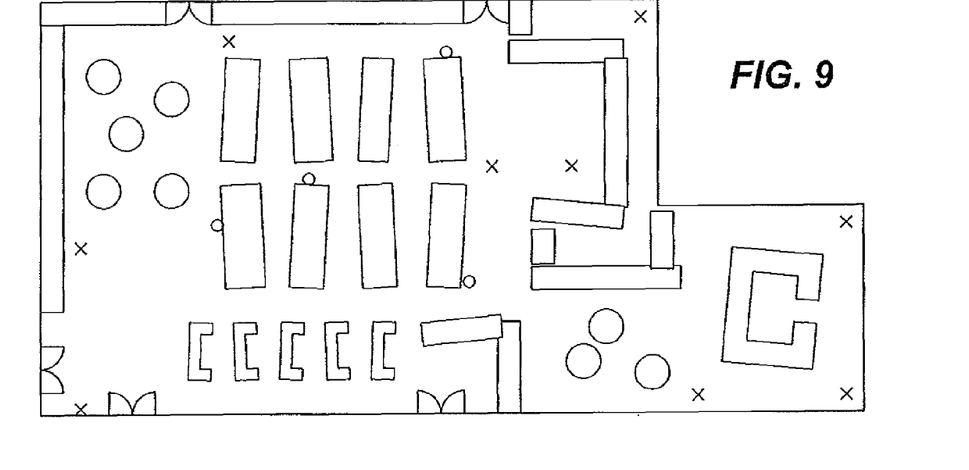
FIG. 9 is a representation of an initial planogram, in accordance with some embodiments of the present invention.

Of course it may be that measurement errors occur. Referring to FIG. 8 (describing the measurement of the rectangular shelf of FIG. 7), the measured points 70 at the top of the shelf are recorded to within the location tolerance of the locationing system. If the points do not match the model exactly the server could calculate an incorrect location 80 of the rectangular top, as compared to its actual footprint on the floor 82. This problem could be exacerbated when the server infers points 72 instead of getting all measurements. As a result, the initial placement of objects on the planogram, could result in at least a few of the objects being located in incorrect positions, as demonstrated in FIG. 9.

Figure 10:
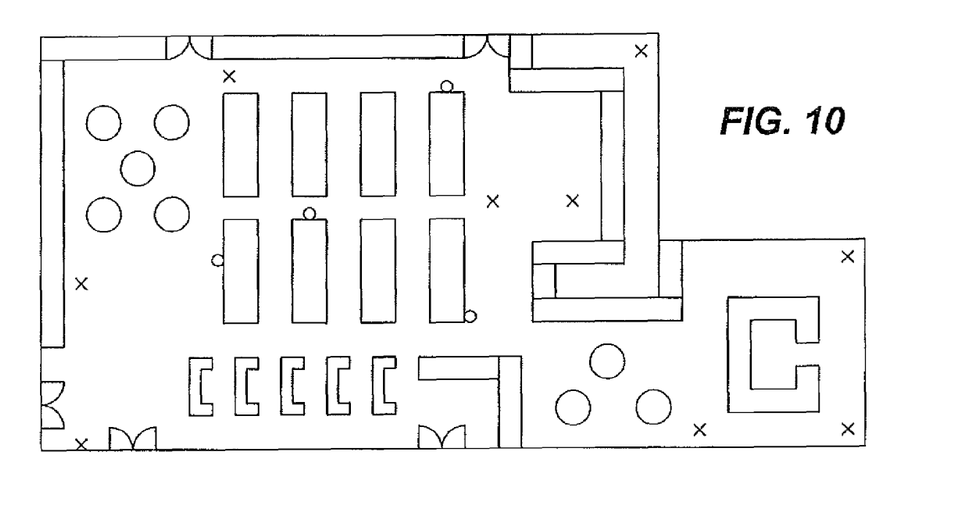
FIG. 10 is a representation of an updated/maintained planogram, in accordance with some embodiments of the present invention.

Slight errors in the position of fixtures can be corrected automatically as subsequent readings, made during normal operation of the store, better define the edges of the fixtures. Over time, as more and more positional information is acquired (thousands of readings made during stock taking for example) the initial coarse planogram is automatically updated and refined, better defining the and maintaining the locations of objects through the averaging of position data, as shown in FIG. 10.

Figure 11:
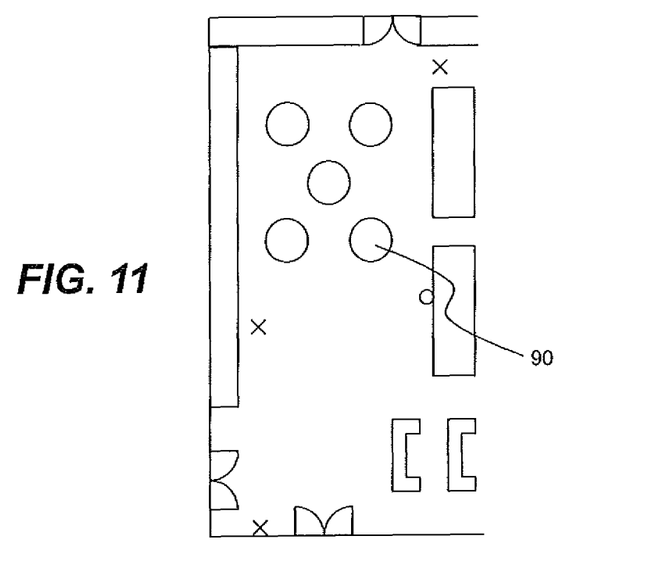
FIGS. 11-12 are diagrams representing the movement of an object, in accordance with some embodiments of the present invention.
Figure 12:
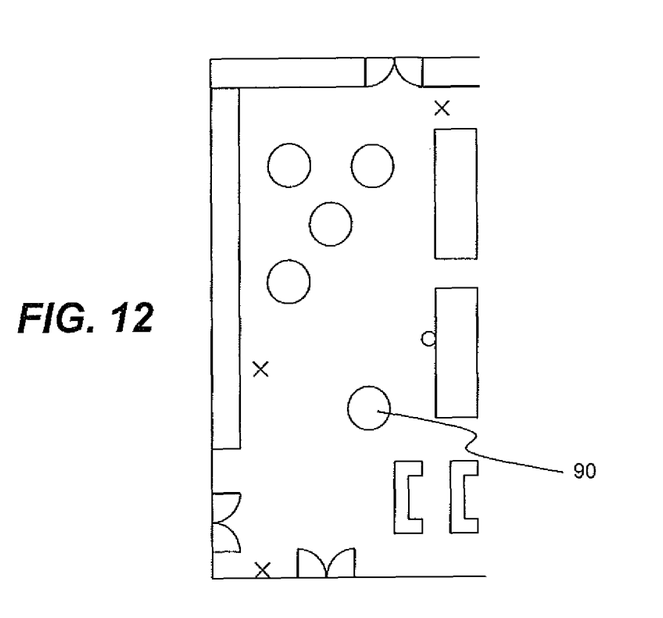
Figure 13:
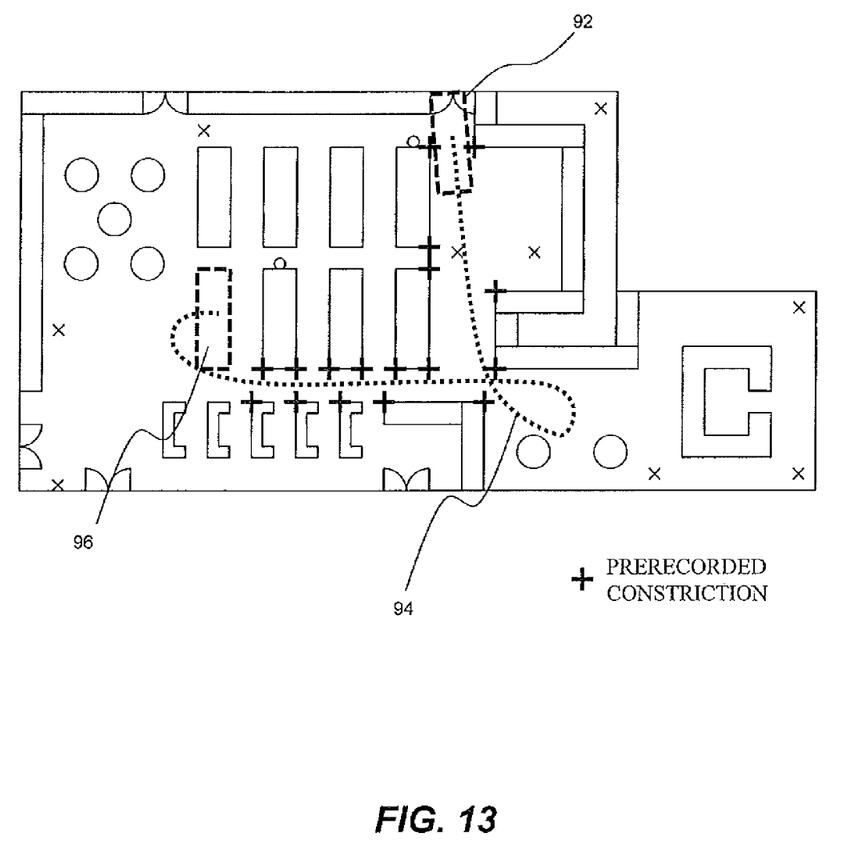
FIG. 13 is a diagram representing the location of a new object, in accordance with some embodiments of the present invention.

Once a planogram is established, the present invention also provides embodiments to make changes to the planogram, such as moving objects within the planogram. For example, referring to FIG. 11, when a rack is to be moved, the rack in question 90 is selected (by selecting the rack from a menu, reading an RFID tag, or scanning a barcode). Then the rack is moved, as in FIG. 12, after which then the mobile device is triggering of the top corners of the rack at the new location, indicating to the server to update the planogram with the new location of the rack. Similarly, referring to FIG. 13, when a new fixture 92 is being brought into the facility, its dimensions can be measured by the mobile device and supplied to the server as a new fixture. Given the planogram with the sizes and positions of all objects, the server can calculate an optimum path 94 through prerecorded constrictions to the specified destination 96. Alternatively, the user could trigger the mobile device at the corners of constrictions along a desired path 94 to determine if the path is feasible. In particular, the user can trigger the mobile device at positions along the sides of path the fixture will take (doorways, aisles, corners, stairwells). Knowing the size of the object being moved and the dimensions of the path it will take, a user can be told beforehand how the object should be manipulated to get it to its destination, avoiding blocked aisles and routes of egress.

As store employees go about their work, the system can also be used to aid them in their regular tasks. Since the system can calculate the geometric positions of multiple points relative to one another, store employees can also use it as a tool to calculate length, area and volume. Another example would be to identify areas in need of attention (e.g. spills that require clean-up) and the location of items in need of repair (e.g. a broken price checker).

It is envisioned in the embodiments herein that the planogram can be presented to a system administrator on a user interface of the server in real-time. For example, the user interface provides a written report or a graphical report via a display on the server or a different computer coupled to the server. In another embodiment, the interface is a network interface configured to provide the report to a remote monitoring device or a remote storage device. For example, the enterprise may store digital copies of all reports for a predefined time period for determining various geometric and non-geometric metrics regarding the planogram.

Figure 14:
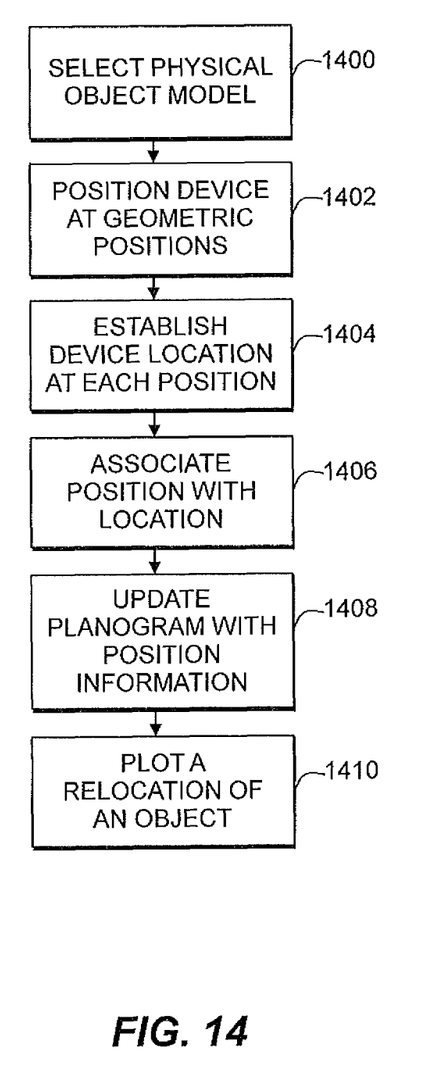
FIG. 14 is a flowchart of a method for generating and maintaining a planogram in real-time, in accordance with some embodiments of the present invention.

FIG. 14 shows a flow chart illustrating a method for generating a planogram of a facility in real-time. The method includes a step 1400 of selecting a predefined three-dimensional physical object modeled in the planogram.

A next step 1402 includes positioning a wireless mobile device at a plurality of geometric positions defining the physical object. In particular, the geometric positions are predefined points on a physical object within the facility.

A next step 1404 includes establishing a location of the mobile device at each geometric position within the facility using a locationing system. This step can include activating a signal for the location mechanism by the mobile device, such as an ultrasonic signal to be received by an ultrasonic receiver.

A next step 1406 includes associating each geometric position with the established location of the mobile device. This can include receiving an acknowledgment of a proper association at the mobile device from the server.

A next step 1408 includes updating the planogram with information about each geometric position. This can include utilizing a plurality of predefined points to define a three-dimensional configuration of the physical object modeled in the planogram. For example, a three-dimensional configuration of the physical object can be inferred from three or less predefined points. In addition, at least three predefined points can be used to define a floor datum plane of the facility. In this case, the three-dimensional configuration is mapped in relation to the floor in the planogram. The three-dimensional configuration is one of a right rectangular box, a right circular cylinder, predefined room fixtures, and irregular objects. This step can include refining the mapping of objects in the planogram through averaging of subsequent establishing of locations of the mobile device.

A next step 1410 includes plotting a relocation of a physical object within the facility utilizing the planogram, which can include moving an existing object or adding/removing an object from the planogram.

Optionally the method can update non-geometric information on the planogram, wherein: establishing 1404 includes simultaneously measuring a non-geometric parameter by the mobile device at the location, associating 1406 includes simultaneously associating the non-geometric parameter with the location, and updating 1408 includes overlaying the planogram with information about the non-geometric parameter at the location of the physical objects. Examples of non-geometric information include: SKU (stock keeping units) locations, wireless local area network signal strength, mobile device signal strength, and (ultrasonic) locationing system parameters.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage element (i.e., medium) having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for generating a planogram of a facility updating newly positioned fixtures in real-time, the method comprising:
   positioning a wireless mobile device at a plurality of geometric reference data defining a geometry of a fixture placed within the facility;
   establishing a location of the mobile device at each geometric reference datum using a locationing system;
   associating each geometric reference datum of the fixture with the established location of the mobile device; and
   updating the planogram with the fixture geometry and position information defined by each geometric reference datum of that fixture,
   wherein multiple geometric reference data are used to calculate one of a length, an area, and a volume of the fixture using ultrasonic technology, by the wireless mobile device, and calculating an optimum path for moving the fixture to a specific location within the generated planogram of the facility.

2. The method of claim 1, wherein establishing includes activating a signal for the locationing system by the mobile device.

3. The method of claim 1, wherein establishing the location of the mobile device is determined using ultrasonic technology.

4. The method of claim 1, wherein the geometric reference data are predefined geometric points on the fixture.

5. The method of claim 4, wherein updating includes utilizing a plurality of predefined geometric points to define a three-dimensional configuration of the fixture modeled in the planogram.

6. The method of claim 4, wherein updating includes utilizing at least three predefined points to establish a floor datum plane of the facility.

7. The method of claim 4, wherein updating includes utilizing at least three predefined points to define a floor datum plane of the facility, and utilizing a further plurality of predefined points to define a three-dimensional configuration of the fixture modeled in the planogram, wherein the three-dimensional configuration of the fixture is mapped in relation to the floor datum plane in the planogram.

8. The method of claim 5, further comprising selecting a predefined three-dimensional fixture modeled in the planogram.

9. The method of claim 8 where selecting is done using a voice command.

10. The method of claim 8, wherein updating includes inferring a three-dimensional configuration of the fixture from three or less predefined points.

11. The method of claim 5, wherein the three-dimensional configuration is one of a right rectangular box, a right circular cylinder, predefined room fixtures, and irregular objects.

12. The method of claim 1, wherein updating includes refining the mapping of fixtures in the planogram through averaging of subsequent establishing locations of the mobile device.

13. The method of claim 1, further comprising plotting a relocation of a fixture within the facility utilizing the planogram.

14. The method of claim 1, wherein the fixture location is used to indicate an area for attention.

15. The method of claim 1, wherein associating includes receiving an acknowledgment of a proper association of a reference datum to the fixture at the mobile device.

16. The method of claim 5, wherein:
establishing includes simultaneously measuring a signal strength by the mobile device at the location,
associating includes simultaneously associating the signal strength with the location, and
updating includes overlaying the planogram with information about the signal strength at the location of the fixtures.

17. A system for generating a real-time planogram of a facility updating newly positioned fixtures in real-time, the system comprising:

a locationing system operable to establish locations of wireless mobile devices within the facility;

a wireless mobile device operable to be positioned at a plurality of geometric reference data defining a geometry of a fixture placed within the facility such that the location system can establish a location of the mobile device at each geometric reference datum, wherein the mobile device can be activated to provide an association of each geometric reference datum of the fixture with the established location of the mobile device; and a server operable to update the planogram with the fixture geometry and position information defined by each geometric reference datum of that fixture, wherein multiple geometric reference data are used to calculate one of a length, an area, and a volume of the fixture using ultrasonic technology, by the wireless mobile device, and calculating an optimum path for moving the fixture to a specific location within the generated planogram of the facility.

* * * * *